US008683955B2

(12) United States Patent
Madsen et al.

(10) Patent No.: US 8,683,955 B2
(45) Date of Patent: Apr. 1, 2014

(54) CENTER SPAR FISH PEN

(75) Inventors: Todd L. Madsen, San Francisco, CA (US); Timothy J. Gregg, Kailua-Kona, HI (US); Langley R. Gace, Bainbridge Island, WA (US)

(73) Assignee: OceanSpar, Inc., Bainbridge Island, WA (US)

( * ) Notice: Subject to any disclaimer, the term of this patent is extended or adjusted under 35 U.S.C. 154(b) by 259 days.

(21) Appl. No.: 13/338,501

(22) Filed: Dec. 28, 2011

(65) Prior Publication Data

US 2012/0167829 A1 Jul. 5, 2012

Related U.S. Application Data

(60) Provisional application No. 61/428,095, filed on Dec. 29, 2010.

(51) Int. Cl.
*A01K 61/00* (2006.01)

(52) U.S. Cl.
USPC ........................................... 119/223; 119/215

(58) Field of Classification Search
USPC .......................................... 119/223, 215, 239
See application file for complete search history.

(56) References Cited

U.S. PATENT DOCUMENTS

| 85,126 A | 12/1868 | Pitt |
| 203,399 A | 5/1878 | Wyckoff |
| 215,031 A | 5/1879 | Webb |
| 1,485,875 A | 3/1924 | O'Malley |
| 1,614,600 A | 1/1927 | Cleaver |
| 2,606,350 A | 8/1952 | French |
| 3,691,994 A | 9/1972 | McPherson |
| 3,702,709 A | 11/1972 | Shaffer |
| 3,992,737 A | 11/1976 | Duel |
| 4,147,130 A * | 4/1979 | Goguel .................... 119/223 |
| 4,252,081 A | 2/1981 | Smith |
| 4,312,296 A | 1/1982 | Stelleman |
| 4,337,553 A | 7/1982 | Fischer |
| 4,380,213 A | 4/1983 | Blair |
| 4,615,301 A | 10/1986 | Maekawa |
| 4,747,369 A * | 5/1988 | Gotmalm .................. 119/223 |
| 5,172,649 A | 12/1992 | Bourgeois |

(Continued)

FOREIGN PATENT DOCUMENTS

| JP | 62-172358 U | 10/1987 |
| WO | 87/03170 A1 | 6/1987 |

OTHER PUBLICATIONS

International Search Report and Written Opinion mailed Aug. 27, 2012, issued in corresponding International Application No. PCT/US2011/067610, filed Dec. 28, 2011, 7 pages.

*Primary Examiner* — Kristen C Hayes
(74) *Attorney, Agent, or Firm* — Christensen O'Connor Johnson Kindness PLLC (57) ABSTRACT

A fish pen (100) includes an elongate spar buoy (110) and a reserve buoyancy buoy (120) disposed over a top end of the spar buoy. Lower and upper rim assemblies (130, 140) are attached to the spar buoy and each other with tension members (150, 152, 154). An adjustable upper connection plate (114) on the spar buoy provides a means for tensioning the tension members. A docking station (190) and portal (185) provide easy access to the fish pen. A deployable panel system (180, 182) allows for crowding fish into a smaller portion of the pen. The panel system may be nonporous and include additional panels (184) such that a portion of the pen can be substantially isolated.

31 Claims, 9 Drawing Sheets

(56) References Cited

U.S. PATENT DOCUMENTS

| | | |
|---|---|---|
| 5,193,481 A | 3/1993 | Loverich |
| 5,359,962 A | 11/1994 | Loverich |
| 5,617,813 A * | 4/1997 | Loverich et al. .............. 119/223 |
| 6,044,798 A | 4/2000 | Foster |
| 6,892,672 B2 | 5/2005 | Klein |
| 7,650,856 B2 | 1/2010 | Quinta Cortiñas |
| 8,028,660 B2 * | 10/2011 | Troy .............................. 119/223 |
| 2008/0110408 A1 | 5/2008 | Thorvardson |

* cited by examiner

CENTER SPAR FISH PEN

CROSS-REFERENCE TO RELATED APPLICATION

This application claims the benefit of U.S. Provision Application No. 61/428,095, filed Dec. 29, 2010, the disclosures of which are hereby expressly incorporated by reference.

BACKGROUND

The seas and other natural water reservoirs have provided an abundant and stable supply of sustenance for millennia. In recent years, however, over-fishing, inefficient harvesting practices, and environmental stressors have resulted in the depletion or decline of certain fish populations in many regions. At the same time, an increasing human population, increasing standards of living, and an increasing awareness of the health benefits of seafood have increased the demand for fish and fish product.

Advances in aquaculture in general and fish farming in particular, and improvements in technology have recently been applied to meet world demand for fish product efficiently and at lower costs. Developments in fish farming also reduce the risks associated with over-fishing existing fish populations. In particular, off-shore cultivation systems employing fish cages or fish pens have found some success. Large, submersible fish pens suitable for aquaculture applications are known in the art to aid in the efficient and bio-responsible cultivation of food sources. Fish pens are placed in a natural body of water, such as a lake, river, or ocean, and stocked with young fish or fry, and the fish are typically fed and maintained until they reach maturity. The fish pens provide a habitat and protection for the fish. Fish pens may be used for freshwater or for saltwater aquaculture.

Some conventional fish farming systems provide a pen that is anchored to the ocean floor. In one embodiment, the pen includes four spar buoys with damper plates coupled to the bottom that dampen the buoy motion caused by wave action. The four spar buoys are typically arranged in a rectangular array with a net fastened to the spar buoys to define a box-like enclosure. Anchor lines extend outwardly and downwardly from each spar buoy to support the nets.

While such conventional fish farming pens have significant advantages, they also have limitations. For example, the fish pen is substantially immobile because the enclosed volume is dependent on the spacing of the individual spar buoys.

More recent innovations in fish pens employing a center spar buoy or center cluster of spar buoys are disclosed in U.S. Pat. No. 5,359,962, to Loverich, and in U.S. Pat. No. 5,617,813, to Loverich et al., both of which are hereby incorporated by reference in their entireties. Loverich et al. discloses a mobile pen for growing fish or shellfish having an elongate central vertical spar buoy surrounded by at least one horizontal net-supporting rim assembly with continuous netting extending from an upper end of the spar buoy to the rim assembly and thence to a lower, submerged end of the spar buoy.

However, there remains a need for improvements in fish pen construction. Fish pens are expensive and can be difficult to assemble and install. Access to aquaculture fish pen in situ is challenging due to its off-shore location, netting exterior, and details of construction. It can be difficult to extract fish from the fish pen and to provide treatment to maintain the health of the fish population.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A fish pen for aquaculture includes an elongate center spar buoy with a reserve buoyancy buoy attached to an upper portion. An upper rim assembly and a lower rim assembly are disposed around the center spar, and attached to the spar with a plurality of tension members. A netting assembly includes a floor portion attached to the center spar and the lower ring assembly, a wall portion attached to the upper and lower rim assemblies, and an upper portion attached to the upper rim assembly and the center spar. Interior panels extending from the center spar to the upper and lower rim assemblies define a smaller operable volume within the netting assembly.

In an embodiment the reserve buoyancy buoy slidably engages a top end of the center spar buoy, for example with a center pipe portion. The fish pen may further comprise a portal door assembly providing access to the enclosed volume, and including upright trough retainers on either side of the portal.

In an embodiment, the fish pen includes a docking station including an upright fender member attached to the upper rim assembly. The fender member may be formed of a steel core covered with a hardened rubber outer covering, and include an inwardly curved lower portion. In an embodiment the docking station further includes a work platform, with a handrail system. In an embodiment the upper rim further includes a rim flange member having a cleat assembly to facilitate securing a watercraft to the fish pen.

In an embodiment, the netting assembly is attached to a fixed netting connector plate the center spar buoy, and the netting assembly does not directly engage the tension members.

In an embodiment, one or more of the interior panels are deployable and/or movable within the volume defined by the netting assembly. In an embodiment the interior panels are nonporous. In an embodiment an additional nonporous panels is provided along the netting assembly between the first and second interior panels.

A fish pen is disclosed having an elongate spar buoy, a reserve buoyancy buoy attached to a top end of the spar buoy, upper and lower rim assemblies attached to the spar buoy with a plurality of tension members, a netting assembly attached to the spar buoy and the upper and lower rim assemblies to define an enclosed volume, and first and second interior panels disposed radially from the center spar to the netting assembly perimeter, wherein the outer edge of the second interior panel is pivotable.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

A currently preferred embodiment of a fish pen 100 in accordance with the present invention will now be described with reference to the figures, wherein like numbers indicate like parts.

Figure 1:
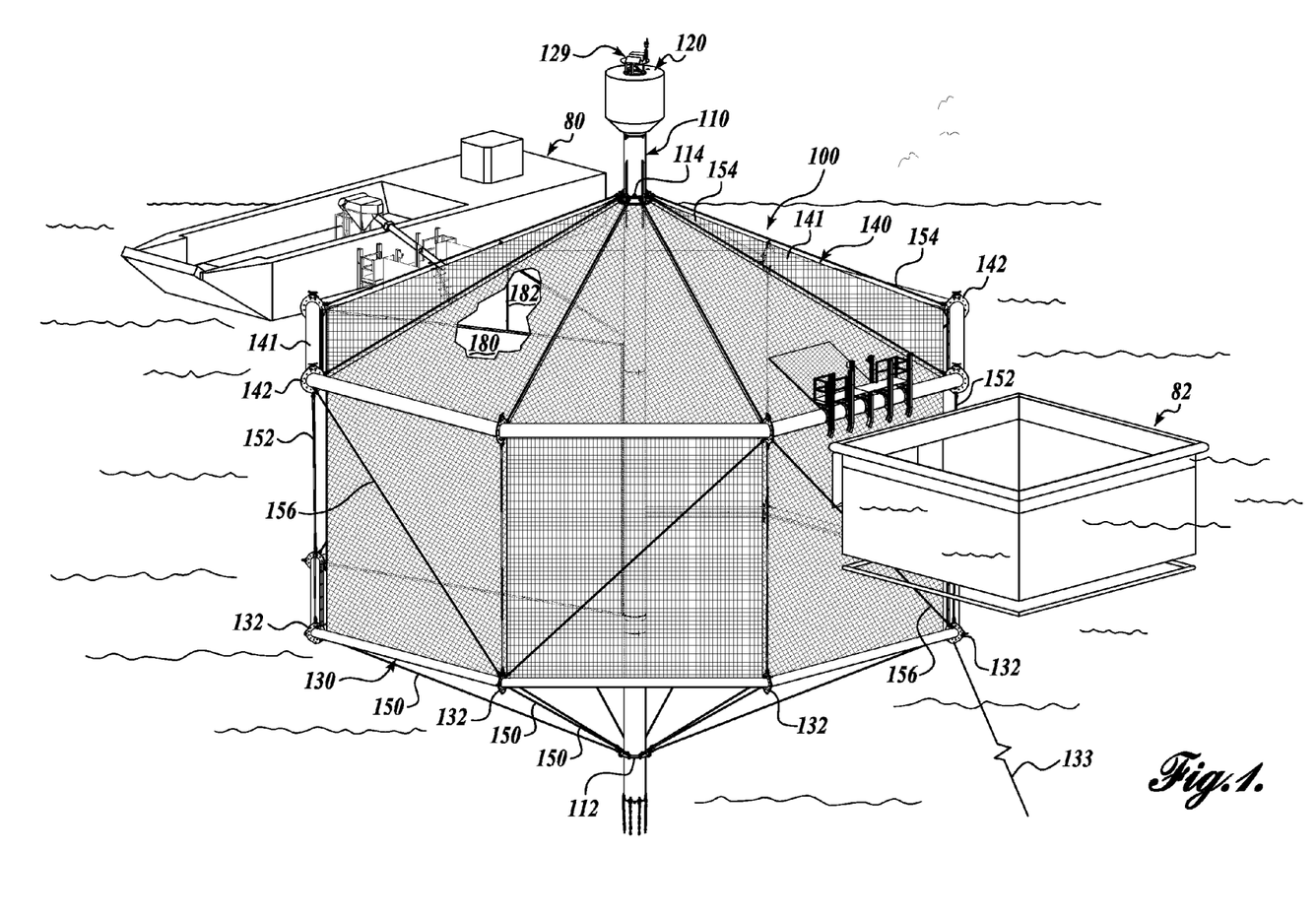
FIG. 1 is an environmental view showing a center spar fish pen in accordance with the present invention with a live fish carrier docked on one side of the pen and a fish transport container positioned on an opposite side.

FIG. 1 shows an environmental view of the fish pen 100 shown with a ship 80 docked on one side of the fish pen 100, and a transfer pen 82 moored near the fish pen 100 opposite the ship 80. The ship 80 may be, for example, a live fish carrier (sometimes referred to as a wellboat) for transporting and transferring immature fish to the fish pen 100. The transfer pen 82 may be connected to the fish pen 100 through a transfer tunnel 102 (FIG. 2) to permit the transfer of fish between the fish pen 100 to the transfer pen 82. In an exemplary system, fry or very immature fish are retained in the transfer pen 82 until they have matured sufficiently to be transferred to the fish pen 100. In another exemplary embodiment, fish ready for market are transferred from the fish pen 100 to the transfer pen 82 and transported therein to a processing station.

Figure 2:
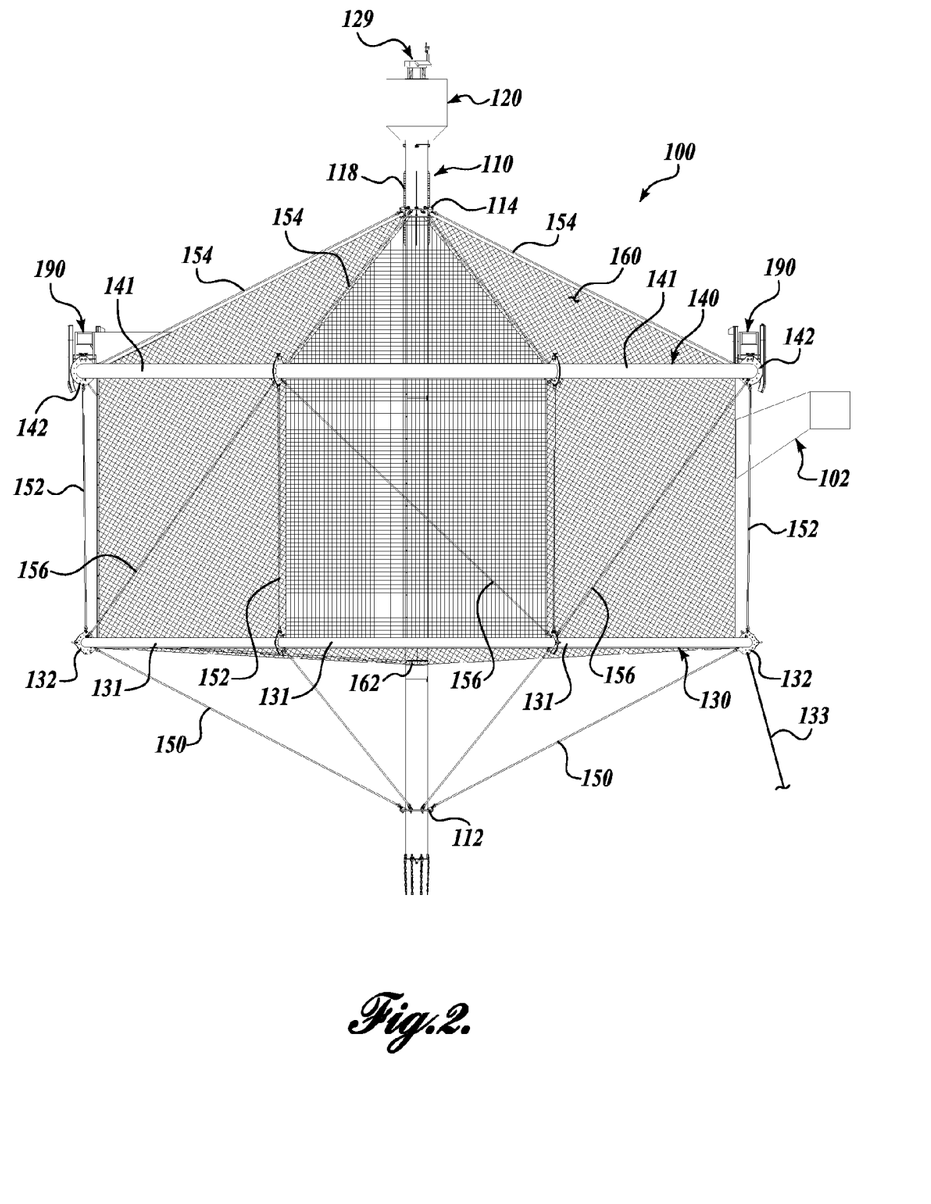
FIG. 2 is a front view of the center spar fish pen shown in FIG. 1 shown in isolation.

Refer also to FIG. 2 which shows a front view of the fish pen 100 in isolation. The fish pen 100 includes an elongate center spar buoy 110, which is configured to be oriented approximately vertically in the body of water. In an exemplary embodiment the center spar buoy 110 is approximately 32 meters long, and slightly less than 1 meter in diameter. A reserve buoyancy buoy or lifejacket buoy 120 is attached over a top portion of the center spar buoy 110.

A lower rim assembly 130 is disposed in a lower position about the center spar buoy 110. The lower rim assembly 130 in the present embodiment comprises eight steel tubular segments 131 arranged to form a generally octagonal rim assembly 130 disposed in a plane perpendicular to the center spar buoy 110. The lower rim assembly 130 is preferably configured to be negatively or neutrally buoyant. For example, the lower rim assembly 130 may be filled with water.

An upper rim assembly 140 is disposed in an upper position about the center spar buoy 110, generally parallel to the lower rim assembly 130. The upper rim assembly 140 may also comprise eight steel tubular segments 141 that are arranged to form a generally octagonal upper rim assembly 140. The upper rim assembly 140 is configured to be positively buoyant. For example, the upper rim assembly 140 may be filled with air or with a buoyant foam material. In the current embodiment, the upper rim tubular segments 141 are larger in diameter than the lower tubular segments 131 to provide a desired design buoyancy. In the exemplary embodiment, the lower rim assembly 130 and the upper rim assembly 140 are otherwise approximately equal in size and shape. For example, in an exemplary embodiment the rim assemblies 130, 140 have a transverse dimension of approximately 27 meters.

Although the preferred embodiment is disclosed, the present invention contemplates fish pens larger or smaller than the disclosed embodiment. For example, the fish pen 100 may be readily scaled to different sizes, and/or with differing aspect ratios, to accommodate the needs of particular applications. It is also contemplated that upper and lower rim assemblies may be constructed with more or fewer segments, including rim assemblies that are circular, oval, or the like. A fish pen, in accordance with the present invention, may include more than two rim assemblies, and/or rim assemblies formed from other materials including flexible materials that are pressurized to maintain a desired shape.

The lower rim assembly 130 includes a plurality of flange assemblies 132. In a current embodiment, the lower tubular segments 131 each include end flange plates that engage corresponding flange plates on adjacent tubular segments 131 to join the segments and define the flange assemblies 132. The upper rim assembly 140 similarly includes a plurality of spaced apart transverse flange assemblies 142.

The center spar buoy 110 and upper and lower rim assemblies 140, 130 are formed into a lightweight, semi-rigid structure with tension members. A set of first tension members 150 each extend from a lower spoke-line connection plate 112 attached to a lower portion of the center spar buoy 110 to a corresponding lower rim flange assembly 132. As seen most clearly in FIG. 3A, the first tension members 150 each have a connector 151 on one end that releasably engages the lower spoke-line connection plate 112. A connector (not shown) on the opposite end releasably engages the corresponding lower rim flange assembly 132.

A set of second tension members 152 each extend from a lower rim flange assembly 132 to a corresponding upper rim flange assembly 142. In the current embodiment, the second tension members 152 each have a connector on one end (not shown) that releasably engages a lower rim flange assembly 132, and a connector 153 on the opposite end that releasably engages an upper rim flange assembly 142 (FIG. 3B).

A set of third tension members 154 each extend from an upper rim flange assembly 142 to an upper spoke-line connection plate 114 disposed about an upper portion of the center spar buoy 110. In the current embodiment, the third tension members 154 each have a connector 155 on one end that releasably engages the associated upper rim flange 142, and a connector 155 on the opposite end that releasably engages the upper spoke-line connection plate 114 (FIG. 3C)

When the tension members 150, 152, 154 are maintained in relatively high tension, the fish pen 100 will substantially comprise a semi-rigid structure maintaining the desired shape while maintaining some desirable flexibility to safely accommodate stressors, for example rogue waves, storm surges, and the like.

Preferably a fourth set of diagonal tension members 156 extend diagonally from the lower rim flange assemblies 132 to the diagonally disposed upper rim flange assemblies 142 to form a W or X truss structure, as seen most readily in FIG. 2. The diagonal tension members 156 reduce or eliminate relative rotational motion between the lower rim assembly 130 and the upper rim assembly 140 providing a desirably more stable geometry.

A unique aspect of the disclosed fish pen 100 is the capability of mooring the fish pen such that the entire net pen will orient in a downstream position relative to the prevailing underwater current direction by securing the mooring line to a single lower rim flange assembly 132. In particular, the edge of the fish pen 100 opposite the single-point anchor connection will orient furthest downstream (i.e., furthest away from the anchor). A major benefit of this aspect is that ectoparasite eggs will tend to accumulate only on the downstream net panel, and the hatch from these ectoparasite will tend to drift downstream from the net pen (as opposed to drifting into the growing volume of the net pen). In a currently preferred embodiment a mooring line or hawser 133 extends from one of the lower rim flange assemblies 132, to a fixed object or anchor (not shown), to anchor the fish pen 100 at a desired location. Therefore, if the fish pen 100 is anchored in a body of water having a changing flow stream direction (for example, in a tidal region), the fish pen 100 will re-orient itself such that the same side is disposed in a downstream direction.

Figure 3A:
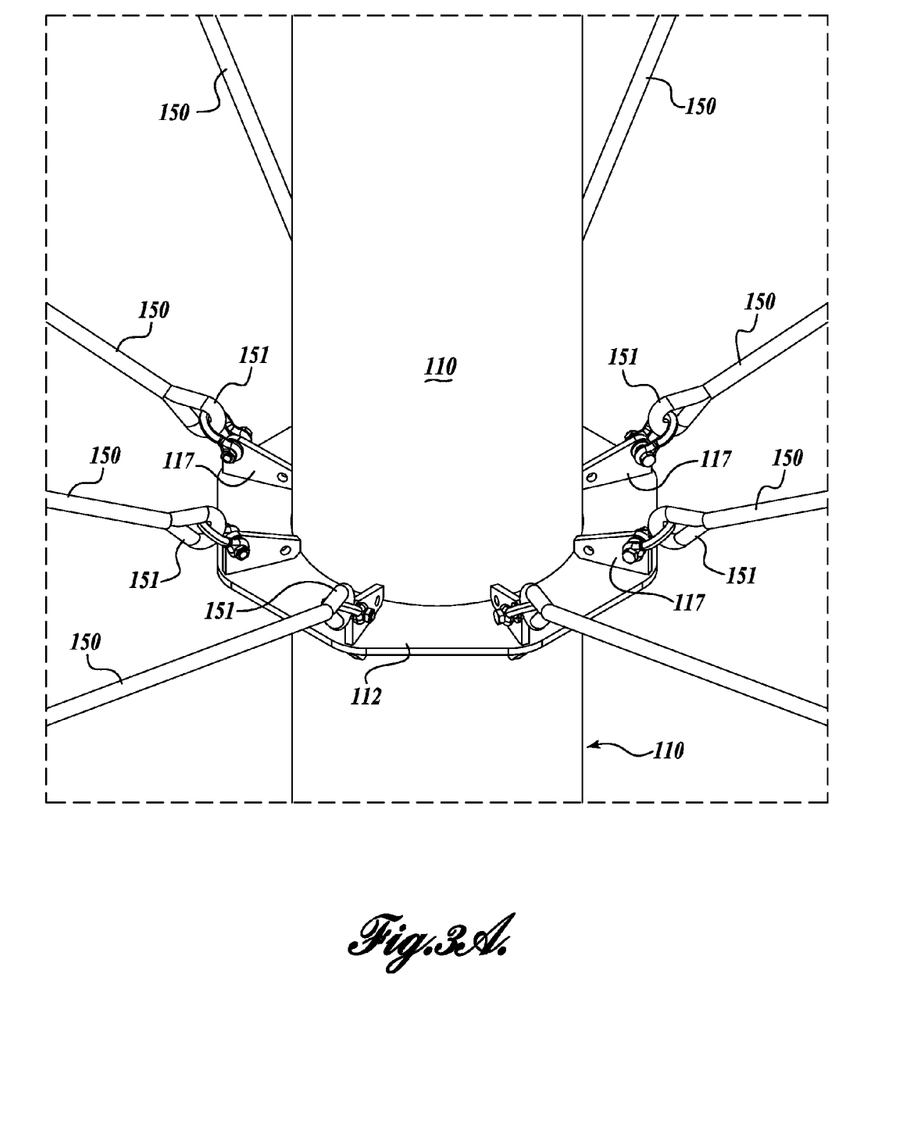
FIG. 3A is a detail view showing the lower spoke-line connection plate attached to the center spar of the fish pen shown in FIG. 1.
Figure 3B:
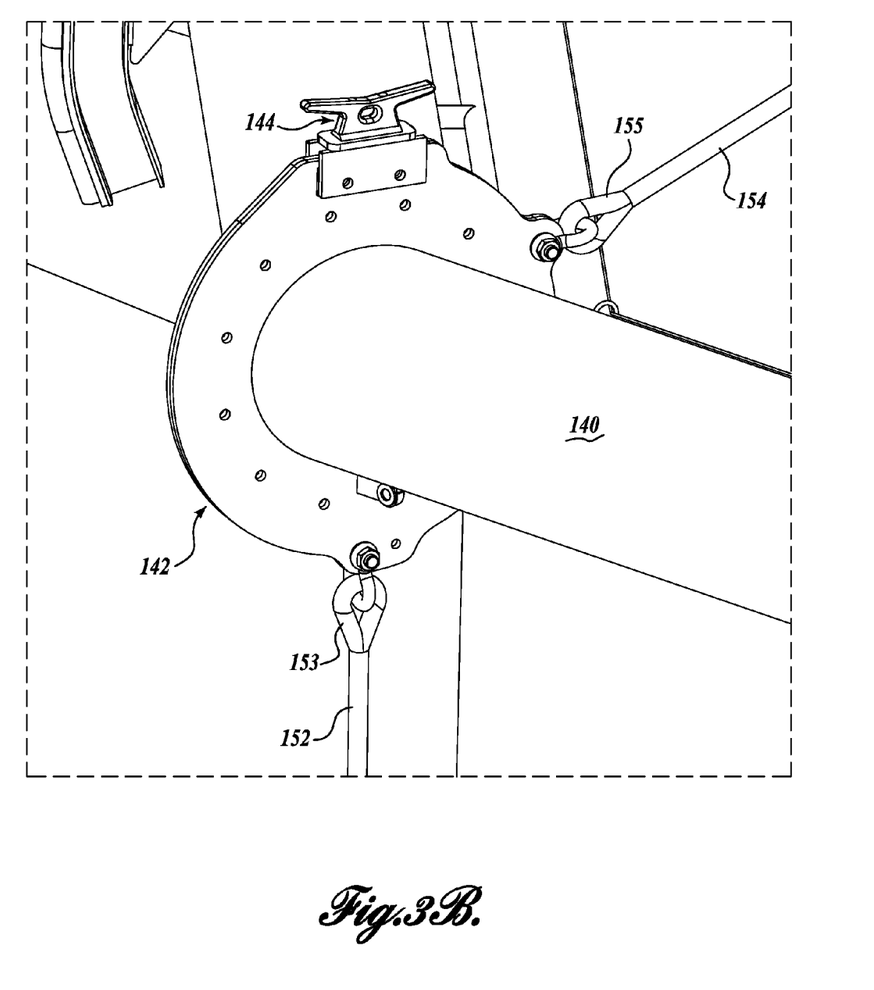
FIG. 3B is a detail view showing one of the upper rim flange assemblies of the fish pen shown in FIG. 1.
Figure 3C:
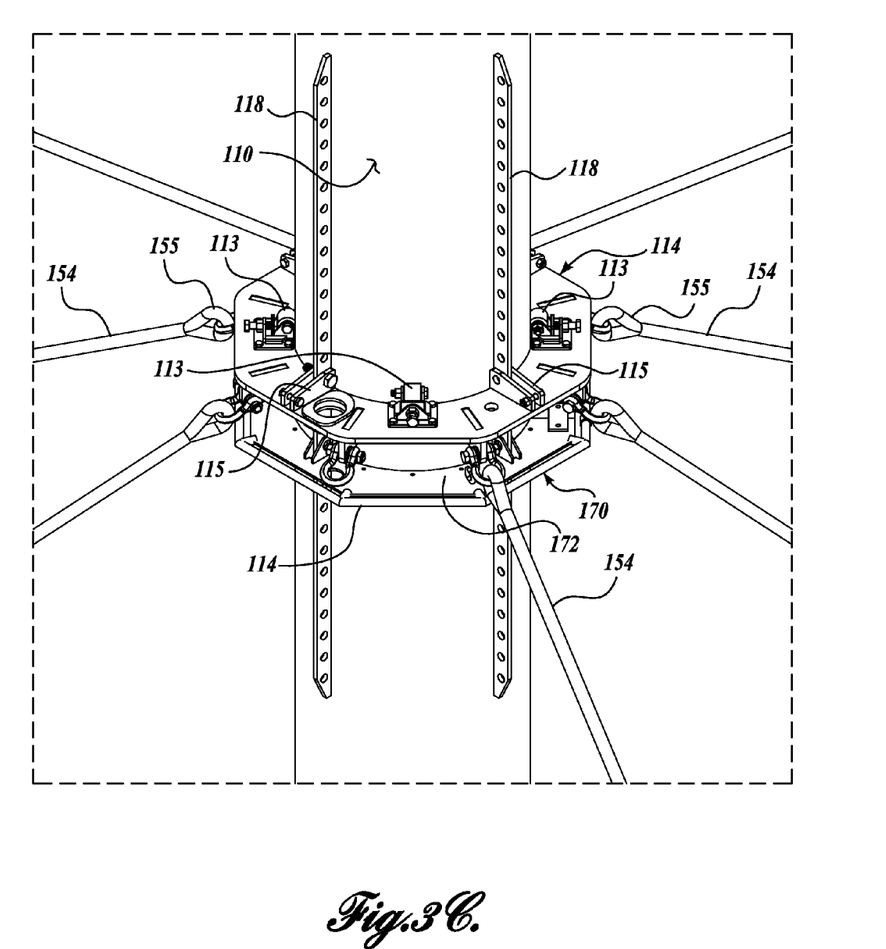
FIG. 3C is a detail view showing the upper spoke-line connection plate and the top net connection plate attached to the spar buoy of the fish pen shown in FIG. 1.

FIG. 3A shows a detail view of the lower spoke-line connection plate 112 fixedly attached to a bottom portion of the center spar buoy 110. Eight cheek plates 117 (six visible) are configured to retain the connectors 151 on the distal ends of the first tension members 150.

FIG. 3B is a detail view showing one of the upper rim flange assemblies 142 from the upper rim assembly 140. In a preferred embodiment, a mooring cleat 144 is also provided on one or more of the upper rim flange assemblies 142, to facilitate watercraft, such as supply ships, maintenance craft, and the like, to dock with the fish pen 100.

FIG. 3C is a detail view showing the upper spoke-line connection plate 114 adjustably attached to a top portion of the center spar buoy 110. Four longitudinal adjustment bars 118 having a plurality of attachment apertures are fixedly attached to the center spar buoy 110 and positioned to engage the upper spoke-line connection plate 114. The upper spoke-line connection plate 114 has a circular center aperture that is slightly larger than the diameter of the upper portion of the center spar buoy 110 with radial cutouts that accommodate the adjustment bars 118 such that the connection plate 114 can move longitudinally along the spar buoy 110. The connection plate 114 includes four sets of cheek plate assemblies 115, each positioned to slidably engage one of the adjustment bars 118, and having locking apertures, such that a bolt or other member can be selectively inserted through the locking apertures and the attachment apertures to fix the connection plate 114 at a desired longitudinal location. Roller assemblies 113 are mounted to the connection plate 114 and engage the center spar buoy 110, to facilitate adjustment of the connection plate 114.

Figure 4:
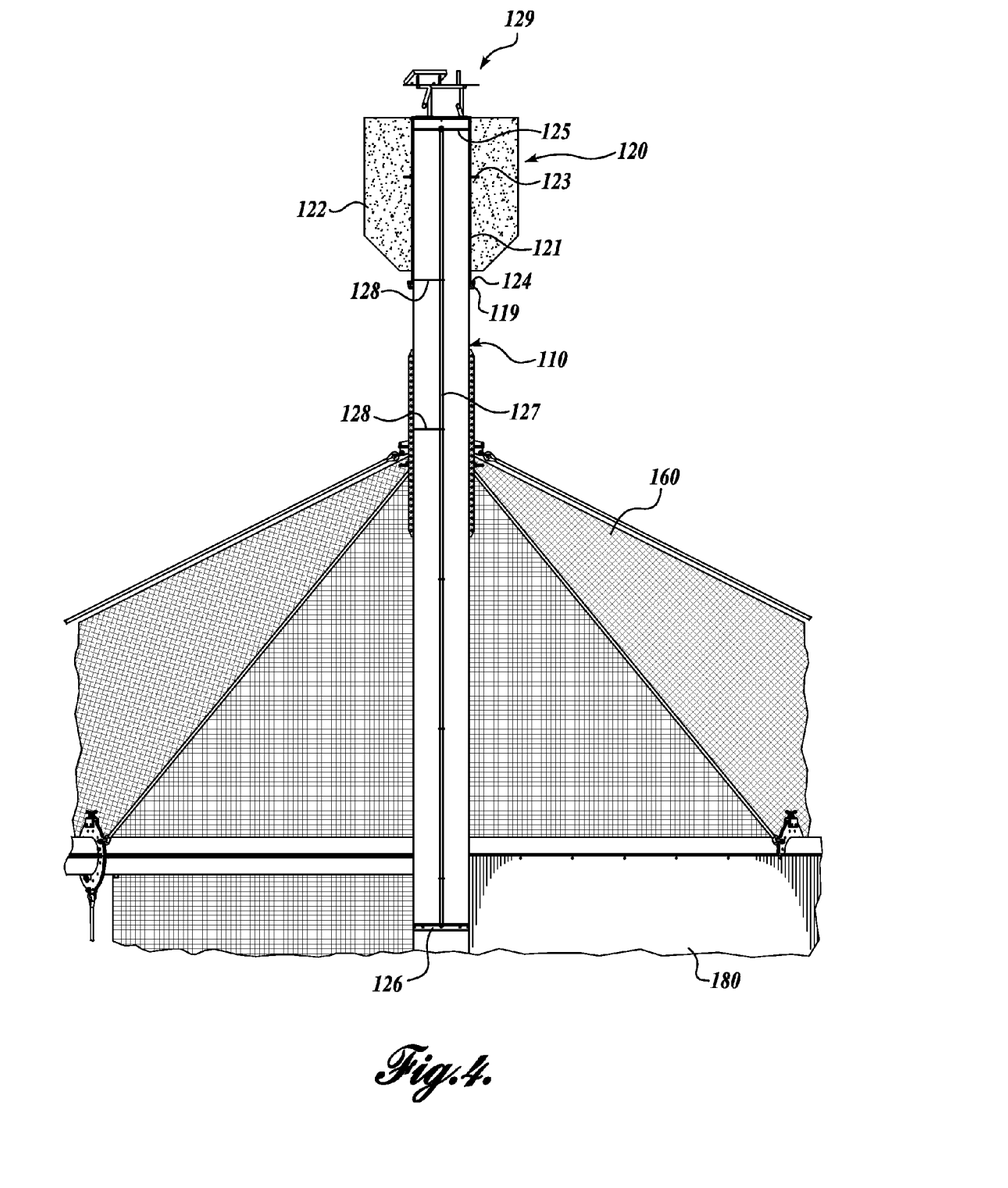
FIG. 4 is a detail cross-section view showing the lifejacket buoy disposed on the spar buoy of the fish pen shown in FIG. 1.

Therefore, to assemble the center spar buoy 110 and upper and lower rim assemblies 130, 140, after attaching the three sets of tension members 150, 152, 154, the upper spoke-line connection plate 114 is pulled upwardly along the center spar buoy 110 with two or more winches to achieve a desired tension. Locking members are inserted through the cheek plates 115 and adjustment bars 118 to lock the upper spoke-line connection plate 114 at the desired position. Advantageously, the disclosed embodiment does not require workers to access the bottom of the center spar buoy during the tensioning step. FIG. 4 is a detail cross-section view showing a top portion of the fish pen 100 including a novel reserve buoyancy, or lifejacket, buoy 120 that supports various support equipment 129. The reserve buoyancy buoy 120 in this embodiment comprises an inner pipe 121 that is sized to be slidably attached over a top end of the center spar buoy 110, and a foam outer body 122 disposed around the inner pipe 121. Optionally, an annular retaining plate 123 is fixed to the inner pipe 121 at an intermediate location to further fix the outer body 122 to the inner pipe 121. The lower end of the inner pipe 121 extends beyond the outer body 122, and includes a flange portion 124 that engages a corresponding flange portion 119 fixed to the center spar buoy 110. The flange portions 119, 124 are operable for securing the reserve buoyancy buoy 120 to the center spar buoy 110.

In addition to providing reserve buoyancy to stabilize the fish pen 100 even in stormy or large-wave conditions, the reserve buoyancy buoy 120 cooperatively with the center spar buoy 110 provides a platform for support equipment 129. For example, the support equipment 129 disposed atop the center spar buoy 110 may include a control system, radio and antenna assembly for monitoring the fish pen 100, a lighting system to increase the visibility of the fish pen at night and/or in adverse weather, a solar cell and battery system, air pump (s) and valve controls to enable raising and lowering the fish pen 100, and the like. In a current embodiment, the support equipment 129 is mounted on a support plate and truss system directly over the center spar buoy 110.

Also shown in FIG. 4 are an upper bulkhead plate 125 and a lower bulkhead plate 126 disposed in an upper portion of the center spar buoy 110. A vent pipe 127 extends between the upper and lower bulkhead plates 125, 126. The lower portion of the center spar buoy 110 is tubular with openings on the bottom end. It will be appreciated, therefore, that to increase the buoyancy of the center spar buoy 110 (e.g., to move the fish pen 100 to a raised position), air is pumped through the vent pipe 127 displacing water from the lower portion of the center spar buoy 110. To decrease the buoyancy of the center spar buoy 110 (e.g., to move the fish pen 100 to a lowered position), a valve on the vent pipe 127 may be opened to allow air in the lower portion of the center spar buoy 110 to escape and to allow water to enter the lower portion of the center spar buoy 110. In the present embodiment, a plurality of spaced-apart vent pipe support plates 128 is provided to support the vent pipe 127 along its length. As seen most clearly in FIGS. 1, 2, and 3C, a netting assembly 160 is supported by the center spar buoy 110 and the upper and lower rim assemblies 130, 140 to define an enclosure for retaining fish. The detail view of FIG. 3C shows a top net connection plate 170 comprising a flange plate portion 172 fixedly attached to the center spar buoy 110, and an annular bar portion 174 that is fixed to the flange plate portion 172. An upper end of the netting assembly 160 is lashed or otherwise attached to the annular bar portion 174 (FIG. 2).

Figure 5:
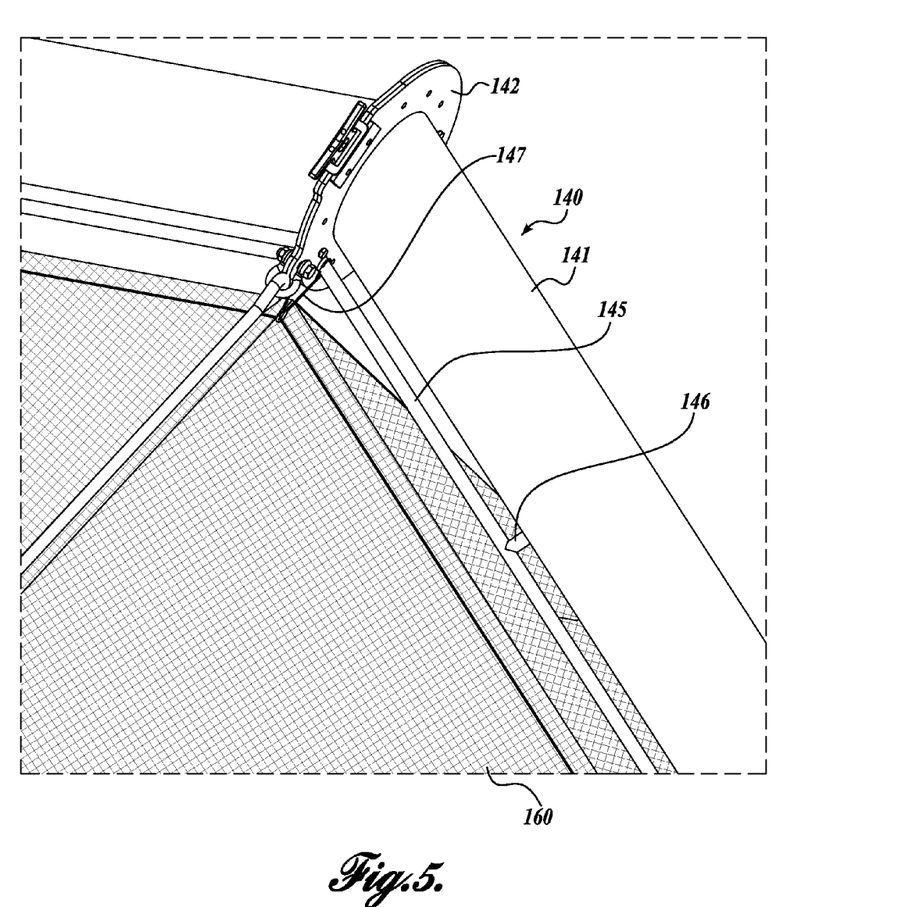
FIG. 5 is a detail view showing the netting assembly connection to one of the upper rim flange assemblies of the fish pen shown in FIG. 1.

FIG. 5 is a detail view showing a representative corner of the upper rim assembly 140 from above, which is similar in relevant aspects to the other corners of the upper and lower rim assemblies 140, 130. The tubular segment 141 includes a stand-off bar 145 that is fixed to the tubular segment with stanchions 146. The netting assembly 160 is attached to the stand-off bars 145 with a cable or lashing assembly 147.

As seen most clearly in FIGS. 1 and 2, the netting assembly 160 extends generally along the inside perimeter of the upper and lower rim assemblies 140, 130. A generally flat portion of the netting assembly 160 forms a floor that engages the center spar buoy 110 with a lower belt 162 (FIG. 2).

A novel aspect of the current fish pen 100 is that the netting assembly 160 is generally independent of the structural tension members 150, 152, 154, 156. This provides advantages in design and construction because more options are open for the material selection for the netting assembly 160.

Figure 6:
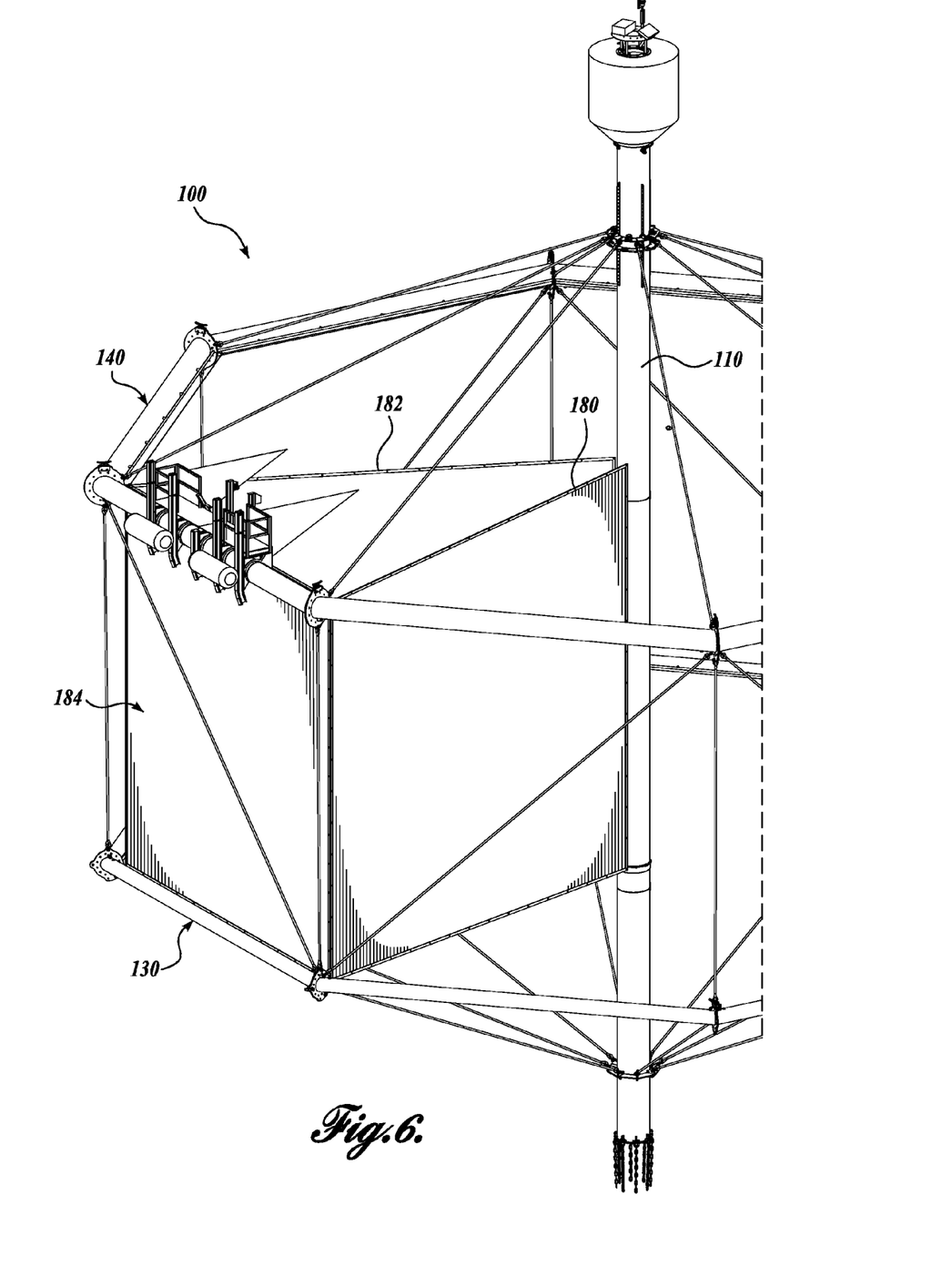
FIG. 6 is a detail view showing the internal wall system of the fish pen shown in FIG. 1.

In a current embodiment, the fish pen 100 includes a fish crowding and/or partitioning system that permits the user to confine some or all of the fish to a smaller section of the volume of the fish pen 100. FIG. 6 is a detail view showing a portion of the fish pen 100 with the netting assembly 160 removed for clarity. A first internal wall 180 extends from the center spar buoy 110 to the upper and lower rim assemblies 140, 130 with a lower edge along the floor of the netting assembly 160 (not shown). The first internal wall 180 may be deployable, and configured to remain at a fixed position when deployed. A second internal wall 182 also extends from the center spar buoy 100 to the upper and lower rim assemblies 140, 130. Therefore, the first and second internal walls delineate a portion of the volume of the fish pen 100.

The second internal wall 182 is preferably deployable and is configured to be swept circumferentially through the fish pen 100 with the inner edge remaining attached to the center spar buoy 100 and the outer edge movable along the netting assembly 160. The lower edge of the second internal wall 182 remains disposed generally at or near the floor portion of the netting assembly 160. The second inner wall 182 may be formed of a netting material to facilitate movement through the water.

In this embodiment, the second internal wall 182 may therefore be initially deployed adjacent the first internal wall 180, and moved around the center spar buoy to a location, for example, to the location shown in FIG. 6, thereby crowding fish in the fish pen 100 into a small region of the fish pen 100. This may be useful, for example, for extracting the fish from the fish pen 100 or for confining fish in one section to allow for maintenance on other portions of the fish pen 100.

It is also contemplated that the first and second inner walls 180, 182 may be formed from a nonporous material, for example, a plastic sheet or the like. Additionally, a similar nonporous internal wall 184 may be deployed along the vertical wall section of the netting assembly 160 adjacent the first and second inner walls 180, 182 and a similar nonporous internal floor section (not shown) may be deployed below the region defined by the first and second inner walls 180, 182. In this configuration, an enclosed region of the fish pen 100 may be selectively isolated from the surrounding body of water when the fish pen is in the raised position. The second inner wall 182 may be swept through the fish pen 100 pivoting about the center spar buoy 110 to crowd the fish into the defined region. Providing a smaller portion of the fish pen 100 substantially isolated from the surrounding body of water will facilitate, for example, treating the fish population when necessary.

For example, if it becomes necessary or desirable to treat the fish with an antimicrobial treatment, antiparasitic, or the like, the fish pen 100 is moved to a raised position, the nonporous internal walls are deployed, and the second internal wall 182 is swept through the fish pen 100 to isolate the fish. A desired treatment may then be deposited into the isolated portion of water, and after waiting sufficient time, the internal wall portions may be retracted. It is contemplated, for example, that other steps may be desirable, for example providing aeration to the isolated water portion during treatment, providing food, etc.

Figure 7:
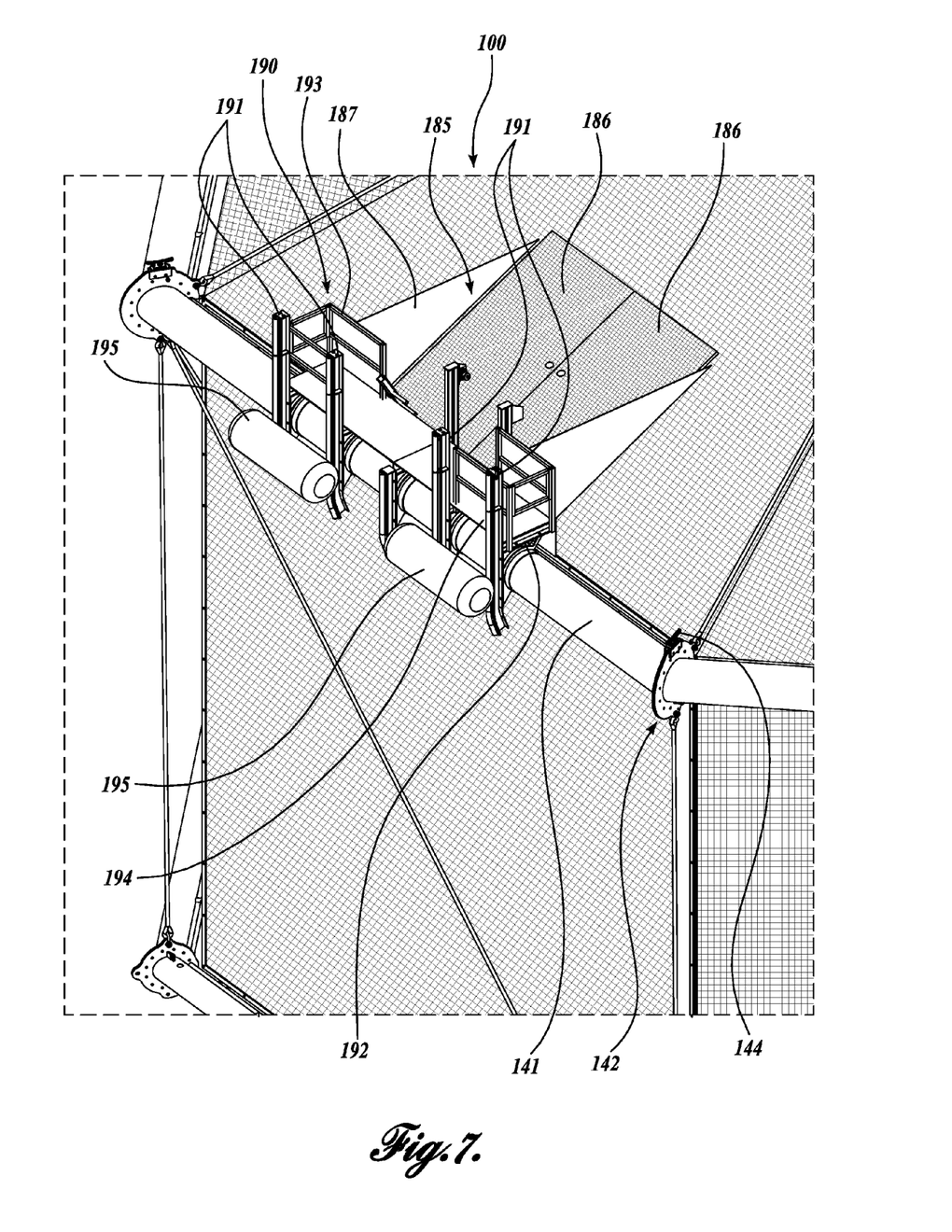
FIG. 7 is a detail view showing a docking station for the fish pen shown in FIG. 1.

The fish pen 100 optionally includes one or more docking station 190 (two shown in FIG. 2) that may include entryways into the fish pen 100. FIG. 7 is a detail view showing a docking station 190 disposed adjacent a closable portal 185. The portal 185 comprises large openings and one or more rigid framed doors 186 that can be opened to provide access to the interior of the fish pen 100. For example, the portal may be used to stock the fish pen 100 or to remove fish, or to gain access for monitoring and/or maintenance of the fish pen 100 or fish. Conventional mechanisms for opening, closing, and/or securing the portal may be used. The portal may further include oppositely disposed fish trough panels or nets 187 that extend upright from the portal 185. The fish trough nets 187 in this embodiment are generally triangular and are operable to prevent fish from escaping from the portal 185 when the portal is open. Preferably, the fish troughs are removable and/or fold down for securement to the netting assembly 160.

The docking station 190 includes a plurality of upright fender members 191 fixed to the side of an upper rim segment 141 with a web member 192. The docking station 190 provides an energy absorbent contact location between a vessel 80 and the fish pen 100. The upright fender members 191 are preferably modular and attached to the upper rim segment 141 with removable fasteners such that they can be quickly and easily replaced. The upright fender members 191 in a current embodiment are fabricated from steel structural members with a hardened rubber marine grade material outer covering. The fender members 191 preferably extend high enough off the water that the railing of a moored vessel will not catch on the top of the fender member 191 from wave-induced motion. The lower portion of the fender members 191 bends in towards the fish pen 100 to avoid any unintended underwater interaction between the hull and the fender members 191. Conventional fender buoys 195 may also be provided. The nearby cleats 144 on the upper rim flange assembly 142 may be used to secure the watercraft 80 to the fish pen 100.

The docking station 190 may further include a work platform 194 with a suitable handrail system 193, to facilitate operator activities, such as stocking or removing fish, performing maintenance, etc. The work platform 194 is affixed to one or more of the upper rim segments 141 and provides the workers with a safe sturdy location to perform normal farm operations. An optional opening in the handrail system 193 allows for easy access to the rim deck from both the fish pen side and ocean side of the work platform 194. Preferably the work platform 194 is fabricated from a non-metal material, such as fiberglass, to decrease weight and is porous to allow water to pass through. A non-skid finish is applied to the top side of the platform 194.

While illustrative embodiments have been illustrated and described, it will be appreciated that various changes can be made therein without departing from the spirit and scope of the invention.

The embodiments of the invention which an exclusive property or privilege is claimed are defined as follows:

1. A fish pen for aquaculture comprising:
   an elongate center spar buoy having an upper spar portion and a lower spar portion;
   a reserve buoyancy buoy attached to a top end of the center spar buoy;
   a lower connection plate attached to the lower spar portion;
   an upper connection plate adjustably attached to the upper spar portion;
   a lower rim having a plurality of flange members;
   an upper rim having a plurality of flange members;
   a plurality of first tension members having a first end attached to the lower connection plate and a second end attached to a corresponding one of the lower rim flange members;
   a plurality of second tension members having a first end attached to one of the plurality of lower rim flange members and a second end attached to a corresponding one of the upper rim flange members;
   a plurality of third tension members having a first end attached to one of the upper rim flange members and a second end attached to the upper connection plate;
   a netting assembly defining an enclosed volume and comprising (i) a floor portion attached to the lower rim and the center spar buoy, (ii) a wall portion extending up from the floor portion, and (iii) an upper portion extending inwardly from the wall portion and attached to the upper rim and the center spar buoy;
a first interior panel having a lower edge adjacent the floor portion, an inner edge engaging the center spar buoy, and an outer edge adjacent the netting assembly wall portion; and
a second interior panel having a lower edge adjacent the floor portion, an inner edge engaging the center spar buoy, and an outer edge adjacent the netting assembly wall portion;
wherein the first and second interior panels are configured to define a smaller operable volume within the netting assembly.

2. The fish pen of claim 1, wherein the reserve buoyancy buoy slidably engage a top end of the center spar buoy.

3. The fish pen of claim 1, wherein the reserve buoyancy buoy comprises a center pipe portion that is configured to slidably engage a top end of the center spar buoy.

4. The fish pen of claim 1, wherein the netting assembly further comprises a portal comprising a door assembly for providing access to the enclosed volume.

5. The fish pen of claim 4, further comprising a pair of oppositely disposed fish trough retainers disposed upright on either side of the portal.

6. The fish pen of claim 4, further comprising a docking station comprising an upright fender member that is attached to the upper rim assembly.

7. The fish pen of claim 6, wherein the upright fender member comprises a steel structural member with a hardened rubber marine grade material outer covering, and further wherein a lower portion of the upright fender member is curved inwardly towards the center spar buoy.

8. The fish pen of claim 6, wherein the docking station is disposed adjacent the portal, and further comprises a work platform that is attached to the upper rim assembly.

9. The fish pen of claim 8, wherein the work platform further comprises a handrail system.

10. The fish pen of claim 6, wherein at least some of the plurality of the upper rim flange members further comprise a cleat assembly configured to facilitate securing a watercraft to the fish pen.

11. The fish pen of claim 1, wherein the center spar buoy further comprises a fixed netting connector plate, and wherein the netting assembly is attached to the netting connector plate.

12. The fish pen of claim 1, wherein the first, second, and third tension members do not directly engage the netting assembly.

13. The fish pen of claim 1, wherein the second interior wall is pivotable about the center spar buoy.

14. The fish pen of claim 1, wherein the second interior panel comprises a porous netting material, and further wherein the outer edge of the second interior panel is configured to be moved circumferentially to sweep the second interior panel through a portion of the enclosed volume.

15. The fish pen of claim 1, wherein the first and second interior panels are nonporous, and further comprising a third nonporous interior panel disposed adjacent the netting assembly between the first and second interior panels.

16. A fish pen for aquaculture comprising:
an elongate spar buoy;
a reserve buoyancy buoy attached to a top end of the spar buoy;
a lower rim assembly;
an upper rim assembly;
a plurality of first tension members having a first end attached to a lower portion of the spar buoy and a second end attached to the lower rim assembly;
a plurality of second tension members having a first end attached to the lower rim assembly and a second end attached to the upper assembly;
a plurality of third tension members having a first end attached to the upper rim assembly and a second end attached to an upper portion of the spar buoy;
a netting assembly defining an enclosed volume and comprising (i) a floor portion attached to the lower rim assembly and the spar buoy and (ii) a wall portion extending up from the floor portion and engaging the upper rim assembly;
a first interior panel having a lower edge adjacent the floor portion, an inner edge attached to the spar buoy, and an outer edge adjacent the wall portion; and
a second interior panel having a lower edge adjacent the floor portion, an inner edge attached to the spar buoy, and an outer edge adjacent the wall portion;
wherein the outer edge of the second panel is pivotable about the spar buoy.

17. The fish pen of claim 16, wherein the reserve buoyancy buoy comprises a center pipe portion that is configured to slidably engage a top end of the spar buoy.

18. The fish pen of claim 16, further comprising a radio and antenna system mounted to the spar buoy above the reserve buoyancy buoy.

19. The fish pen of claim 16, wherein the netting assembly further comprises a portal comprising an openable door assembly for providing access to the enclosed volume.

20. The fish pen of claim 19, further comprising a pair of oppositely disposed fish trough retainers disposed upright on either side of the portal.

21. The fish pen of claim 19, further comprising a docking station comprising a plurality of upright fender members that are attached to the upper rim assembly.

22. The fish pen of claim 21, wherein the upright fender members comprise steel structural members with a hardened rubber marine grade material outer covering, and further wherein a lower portion of the upright fender members is curved inwardly towards the center spar buoy.

23. The fish pen of claim 21, wherein the docking station is disposed adjacent the portal, and further comprises a work platform that is attached to the upper rim assembly.

24. The fish pen of claim 23, wherein the work platform further comprises a handrail system.

25. The fish pen of claim 16, wherein the netting assembly is attached to the spar buoy with a fixed netting connector plate and the plurality of third tension members are attached to the upper portion of the spar buoy with an adjustable upper connection plate.

26. The fish pen of claim 16, wherein the first, second, and third tension members do not directly engage the netting assembly.

27. The fish pen of claim 16, wherein the second interior wall is pivotable about the spar buoy.

28. The fish pen of claim 16, wherein the second interior panel comprises a porous netting material, and further wherein the outer edge of the second interior panel is configured to be moved circumferentially to sweep the second interior panel through a portion of the enclosed volume.

29. The fish pen of claim 16, wherein the first and second interior panels are nonporous, and further comprising a third nonporous interior panel disposed adjacent the netting assembly between the first and second interior panels.

30. A method for retaining fish in open water comprising:
providing a fish pen comprising an elongate spar buoy; a reserve buoyancy buoy attached to a top end of the spar buoy; a lower rim assembly; an upper rim assembly; a plurality of tension members configured to attach the lower and upper rim assemblies to the spar buoy; a netting assembly defining an enclosed volume and comprising (i) a floor portion attached to the lower rim assembly and the spar buoy, (ii) a wall portion extending up from the floor portion, and (iii) an upper portion attached to the upper rim assembly and the spar buoy; a first interior panel having a lower edge adjacent the floor portion, an inner edge attached to the spar buoy, and an outer edge adjacent the wall portion; and a second interior panel having a lower edge adjacent the floor portion, an inner edge attached to the spar buoy, and an outer edge adjacent the wall portion;

docking a watercraft containing a plurality of live fish to the upper rim assembly;

depositing the plurality of live fish into a volume defined by netting assembly;

wherein the outer edge of the second panel is pivotable about the spar buoy such that the plurality of live fish can be crowded into a smaller portion of the volume defined by the netting assembly.

31. The method of claim 30 further comprising mooring the fish pen from a single location on the lower rim assembly such that the fish pen will automatically reorient itself in a flow stream to direct a side opposite the single location in a downstream direction.

\* \* \* \* \*